H. A. CRANCE.
Churn Dasher.
No. 80,921. Patented Aug. 11, 1868.
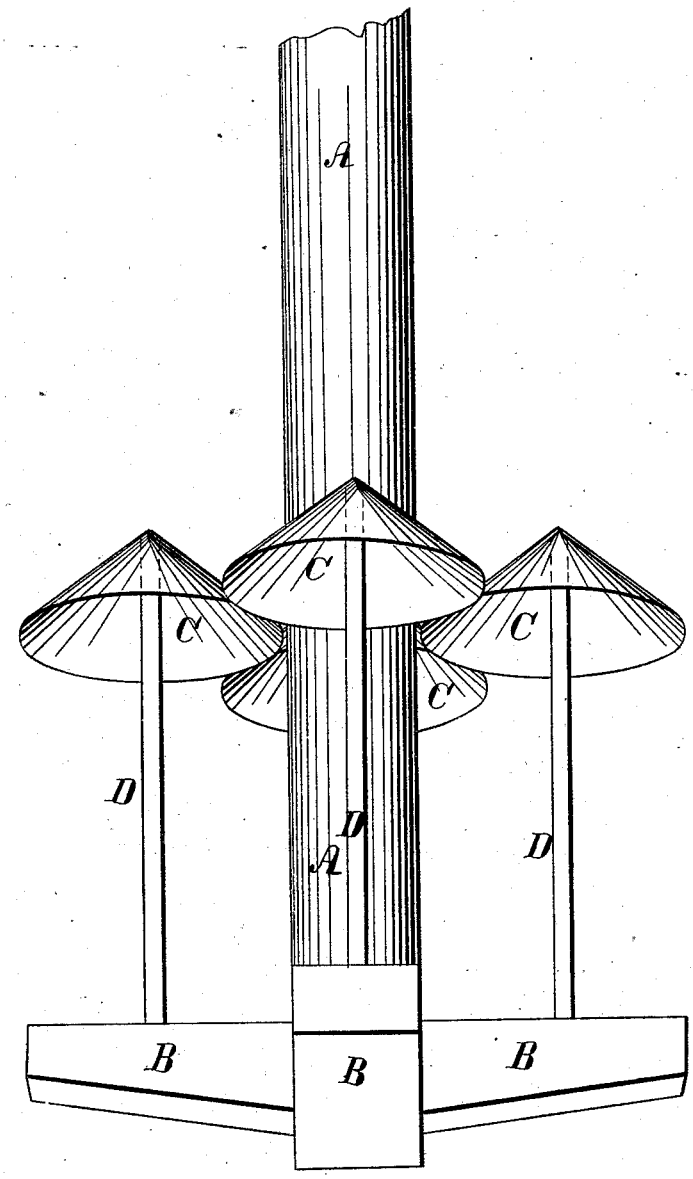

United States Patent Office.

HENRY A. CRANCE, OF LEWISBURG, PENNSYLVANIA.

Letters Patent No. 80,921, dated August 11, 1868.

IMPROVEMENT IN CHURN-DASHERS.

The Schedule referred to in these Letters Patent and making part of the same.

TO ALL WHOM IT MAY CONCERN:

Be it known that I, HENRY A. CRANCE, of the town of Lewisburg, in the county of Union, in the State of Pennsylvania, have invented a new and useful Improvement in Churn-Dashers; and I do hereby declare that the following is a full and exact description thereof, reference being had to the accompanying drawings, and the letters of reference marked thereon.

My improvement consists in attaching hollow cones, C C C C, to the arms, B B, of any common churn-dasher (as shown by the annexed drawings) by means of the rods D D D. These cones C C C C¹ may be made of tin, or any metal or wood suitable for the purpose, and are attached to the rods D D D by soldering, the rods D D D being constructed of wire, of size and kind suitable for the purpose. The rods D D D are attached to the arms B B B of the dasher by means of holes through said arms, and may be secured by means of riveting a head thereon, or screwing a nut on said rods, on the lower or under side of said arms. The purpose of attaching the aforesaid cones in the position as described is that, in forcing the dasher downward in the cream, (in the act of churning,) air is caught under said cones, and carried downward in the cream, and, escaping upward, more thoroughly agitates the cream, producing butter from cream or milk in much less time, and with less labor, than by the old process of churning with a plain dasher.

Having stated and described the construction and operation of my improvement, I will proceed to state what I claim, and desire to secure by Letters Patent.

I claim the attaching of the cones C C C C to the arms of a churn-dasher, in the manner and substantially as described.

HENRY A. CRANCE.

Witnesses:
   GEORGE H. BRISTOL,
   HENRY H. HOWE.